United States Patent
Huang et al.

(10) Patent No.: US 9,416,270 B2
(45) Date of Patent: Aug. 16, 2016

(54) POLYAMIDE COMPOSITION FOR LOW TEMPERATURE APPLICATIONS

(75) Inventors: Jianfeng Huang, Shanghai (CN); Jiayu Yuan, Shanghai (CN); Lei Wang, Shanghai (CN); Shuwen Peng, Shanghai (CN); Jie Wei, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/353,955

(22) PCT Filed: May 31, 2012

(86) PCT No.: PCT/CN2012/076319
§ 371 (c)(1),
(2), (4) Date: Jul. 10, 2014

(87) PCT Pub. No.: WO2013/071744
PCT Pub. Date: May 23, 2013

(65) Prior Publication Data
US 2014/0336317 A1    Nov. 13, 2014

(30) Foreign Application Priority Data

Nov. 14, 2011   (WO) ............... PCT/CN2011/082153

(51) Int. Cl.
| C08L 77/06 | (2006.01) |
| C08L 77/00 | (2006.01) |
| C08L 77/02 | (2006.01) |

(Continued)

(52) U.S. Cl.
CPC ................ *C08L 77/06* (2013.01); *C08L 77/00* (2013.01); *C08L 77/02* (2013.01); *B29C 45/0001* (2013.01); *B29K 2077/00* (2013.01); *B65D 63/1027* (2013.01); *C08L 2205/025* (2013.01); *C08L 2205/03* (2013.01)

(58) Field of Classification Search
CPC ......... C08L 77/00; C08L 77/06; C08L 77/02; C08K 3/346; C08K 3/34; C08K 5/20
USPC ...................................................... 524/227
See application file for complete search history.

(56) References Cited

U.S. PATENT DOCUMENTS

| 3,994,121 A | 11/1976 | Adams |
| 4,391,936 A * | 7/1983 | Waggoner ...................... 524/89 |

(Continued)

FOREIGN PATENT DOCUMENTS

| CN | 1912004 A | 2/2007 |
| CN | 10156550 A | 10/2009 |

(Continued)

OTHER PUBLICATIONS

Machine translation of JP 10-204290. Aug. 1998.*

(Continued)

*Primary Examiner* — John Uselding
(74) *Attorney, Agent, or Firm* — Faegre Baker Daniels LLP

(57) ABSTRACT

A polyamide composition is formed from a low viscosity polyamide-6 and a nucleating agent. The nucleating agent includes an organic material, a first inorganic material and a second inorganic material. Suitable organic materials include organic polymers. Suitable inorganic metallic materials include metal oxides and silicates. The polyamide composition may include polyamide-66 materials and carbon black.

20 Claims, 10 Drawing Sheets

(51) Int. Cl.
   *B65D 63/10* (2006.01)
   *B29C 45/00* (2006.01)
   *B29K 77/00* (2006.01)

(56) References Cited

U.S. PATENT DOCUMENTS

| | | | |
|---|---|---|---|
| 4,804,508 | A | 2/1989 | Double et al. |
| 5,330,834 | A | 7/1994 | Windley |
| 5,344,708 | A | 9/1994 | Windley |
| 6,332,994 | B1 | 12/2001 | Karageorgiou |
| 6,562,896 | B2 | 5/2003 | Lysek et al. |
| 7,022,265 | B2 | 4/2006 | Cheng et al. |
| 7,261,849 | B2 | 8/2007 | Miller et al. |
| 8,356,608 | B2 | 1/2013 | Takehana |
| 8,530,001 | B2 | 9/2013 | Bradley et al. |
| 2003/0042650 | A1 | 3/2003 | Vassilatos |
| 2010/0227973 | A1 | 9/2010 | Facinelli et al. |
| 2010/0311882 | A1 | 12/2010 | Eibeck et al. |
| 2011/0263777 | A1* | 10/2011 | Nakagawa .................. 524/492 |

FOREIGN PATENT DOCUMENTS

| | | |
|---|---|---|
| CN | 101565550 A | 10/2009 |
| CN | 101792596 A | 8/2010 |
| CN | 101845221 A | 9/2010 |
| DE | 129271 A3 | 2/1976 |
| EP | 0335873 B1 | 6/1993 |
| EP | 760026 B1 | 5/1994 |
| EP | 0904435 B1 | 12/2001 |
| EP | 1268892 B1 | 1/2003 |
| FR | 2858624 A1 | 2/2005 |
| JP | 52074019 A | 6/1977 |
| JP | 5299345 A | 8/1977 |
| JP | 58214522 A | 12/1983 |
| JP | 3000809 A | 5/1989 |
| JP | 10-204290 * 8/1998 ............. C08L 77/02 |
| JP | 3613882 B | 11/2004 |
| RO | 105174 B1 | 9/1992 |
| WO | 03/054087 A2 | 7/2003 |
| WO | 2013/071744 A1 | 5/2013 |

OTHER PUBLICATIONS

Bruggolen P22 Data Sheet. Oct. 2007.*
Licomont CaV 102. 2010.*
PCT International Search Report & Written Opinion issued in PCT/CN2012/076319 dated Sep. 27, 2012.
Singapore Search Report and Written Opinion issued in SG Application 11201402052Q, dated Sep. 30, 2015, 14 pages.
BruggemannChemical. Bruggolen P 22 Nucleating Agent for Polyamides. BruggemannChemical Technical Information: Polymer Additives, 2 pages, 2007.

* cited by examiner

US 9,416,270 B2

POLYAMIDE COMPOSITION FOR LOW TEMPERATURE APPLICATIONS

CROSS-REFERENCE TO RELATED APPLICATION

This application is a national phase application of PCT Application No. PCT/CN12/76319, internationally filed May 31, 2012.

FIELD OF THE INVENTION

The present invention is generally related to the field of polyamides. In particular, the present invention is related to polyamide compositions that include polyamide-6, a combination of nucleating agents, as well as blends of nucleated polyamide-6 and polyamide-66.

DESCRIPTION OF RELATED ART

Stable low molecular weight and low viscosity polyamides, such as polyamide-6 (PA6) and polyamide-66 (PA66), are used for a variety applications including for engineering plastics and textile applications. In the area of engineering plastics, these polyamides may be used in applications utilizing injection molding techniques.

The relative properties and performance characteristics of PA6 and PA66 make each polymer more suitable for certain applications. For example, cable ties used in the auto and electronics industries have historically been manufactured from PA66 using an injection molding process to meet industry performance requirements. Although PA6 offers certain benefits over PA66 for manufacturing cable ties, issues with poor mold release, breakage and brittleness have impeded the manufacture of cable ties from PA6.

SUMMARY OF THE INVENTION

An embodiment of the invention is a polyamide composition including at least one polyamide-6 material and a nucleating agent that includes at least one organic material and at least first and second inorganic materials.

Another embodiment of the invention is a polyamide composition that includes about 1 to 99 weight percent (wt. %) nucleated polyamide-6 material, about 99 to 1 wt. % polyamide-66 material and about 0.001 to about 20 wt. % carbon black. The nucleated polyamide-6 material includes at least one organic nucleating material and at least first and second inorganic nucleating materials.

DETAILED DESCRIPTION

Figure 1:
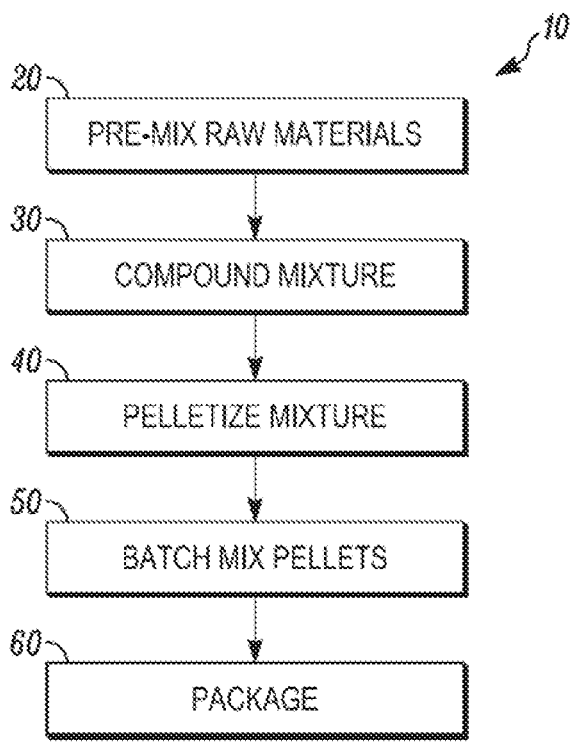
FIG. 1 is a flowchart illustrating a method of forming a polyamide composition according to embodiments of the present invention.

The present invention relates to polyamide compositions useful for a variety of applications including for the manufacture of cable ties by injection molding processes. Additional uses include outdoor applications such as automotive fittings, skiing fittings, connectors, housings, fastening devices and the like. In many instances, the polyamide compositions described herein provide balanced strength as well as low temperature toughness.

In some embodiments, a polyamide composition includes at least one polyamide-6 material, at least one nucleating agent and at least one optional lubricant. The combination of at least one PA6 composition, at least one nucleating agent and at least one optional lubricant may be considered as forming a nucleated PA6. In some embodiments, a polyamide composition includes a combination of PA66, carbon black and a nucleated PA6.

I. NUCLEATED PA6

Suitable PA6 materials are generally formed by reacting caprolactam and aminocaproic acid under temperature conditions suitable to initiate polymerization. Different PA6 materials can be produced by changing the reaction time and/or temperature, by the inclusion of catalysts and by forming various end groups on the PA6 material. Examples of commercially available PA6 materials include the Aegis® brand PA6 products available from Honeywell International Inc. Specific examples of these products are sold under the brand designations H35ZI, H8202NLB, H35L, H50LN and H50L. The PA6 may constitute at least about 90 wt. % of the polyamide composition, more particularly, at least about 95 wt. % of the polyamide composition. In one embodiment, the PA6 may have a low viscosity, for example, less than about 52 FAV, more particularly, between about 25 and about 42 FAV, and even more particularly, between about 30 FAV and 42 FAV.

In some embodiments, the nucleating agent may include mixtures of organic and inorganic components. Examples of suitable organic materials include organic salts such as carboxylic acid salts, amides such as arylamides, and organic polymers. Various polyamide materials other than PA6 may be particularly suitable. In particular polyamides having a ratio of carbon atoms to amide groups of less than 5:1, more particularly, less than 3:1, even more particularly, no more than 2:1. An exemplary polyamide is polyamide-22 (PA22).

Examples of inorganic materials suitable for use in the nucleating agent include inorganic metallic materials. Suitable inorganic metallic materials include metal oxides and metal silicates. Particularly suitable inorganic metallic materials include alumina silicate, aluminum oxide and silicon dioxide. Other suitable inorganic materials include talc, mica, kaolin, asbestos, alumina, silica, silver bromide, graphite, molybdenum disulfide, lithium fluoride, sodium phenylphosphinate, sodium isobutylphosphinate, magnesium oxide, mercuric bromide, mercuric chloride, cadmium acetate, lead acetate, silver chloride and the like.

In some embodiments, the nucleating agent may include at least two inorganic materials. In some embodiments, one of the inorganic materials may be a clay. In some embodiments, the clay may be a nano clay. Nano clays are nanoparticles of layered mineral silicates. Examples of types of nano clays include montmorillonite, bentonite, kaolinite, hectorite and halloysite. In some embodiments, the clay is a montmorillonite, which includes layers of aluminosilicate that are about 1 nanometer thick. In some embodiments, the clay may also include magnesium. In some embodiments, the clay may be an organic modified montmorillonoid clay. In some cases, including an organic ion can help to separate the layers of aluminosilicate.

In some embodiments, at least some of the native sodium and/or calcium ions in the montmorillonoid clay may be replaced with a variety of different ammonium ions. Illustrative examples of suitable organic modifiers include but are not limited to bis(2-hydroxy-ethyl)methyl rapeseed ammonium, bis(2-hydroxy-ethyl)methyl coco ammonium, bis(2-hydroxy-ethyl)methyl tallow ammonium, trimethyl tallow quaternary ammonium, trimethyl tallow quaternary ammonium, trimethyl hydrogenated-tallow ammonium, trimethyl hydrogenated-tallow ammonium, dimethyl hydrogenated-tallow ammonium, methyl bis(hydrogenated-tallow)ammonium and dimethyl bis(hydrogenated-tallow)ammonium.

Illustrative but non-limiting examples of commercially available organically modified montmorillonoid clay materials include GK-8, having an unknown organic modifier and being available from Jiangxi Gukang of Yichun, Jiangxi China (www.jxgukang.com), NANOMER I.34TCN, including bis(2-hydroxy-ethyl)methyl tallow ammonium as organic modifier and being available from Nanocore in the United States (www.nanocor.com), CLOISITE® 30 B and CLOISITE®93A, both of which are available in the United States from Southern Clay (www.scprod.com). CLOISITE® 30 B includes bis(2-hydroxy-ethyl)methyl tallow ammonium as organic modifier while CLOISITE®93A includes methyl bis(hydrogenated-tallow) ammonium as organic modifier.

In an alternate embodiment, the polyamide composition may include at least one alpha form nucleating agent and at least one gamma form nucleating agent. PA6 contains two types of stable crystal forms: monoclinic alpha form and monoclinic (or pseudohexagonal) gamma form. The crystal structure that forms when PA6 is crystallized from the melt may be influenced by thermal conditions, applied stress, presences of moisture, and additives such as nucleating agents. Alpha form nucleating agents predominantly encourage the formation of alpha form crystals while gamma form nucleating agents predominantly encourage the formation of gamma form crystals. Examples of suitable alpha form nucleating agents include the polyamide nucleating agents discussed herein, and PA22 in particular. Examples of suitable gamma form nucleating agents include the nano clay materials discussed herein, and the montmorillonoid clay materials in particular By combining an alpha form nucleating and a gamma form nucleating agent, a balanced crystallization rate and toughness can be obtained. As further demonstrated in the examples, this balance may be attributable to the more complex crystal formed by combining the nucleating agents. In one embodiment, the polyamide composition includes sufficient amounts of the gamma form nucleating agent to produce a polyamide composition that is predominantly gamma crystal form. Compositions containing both the alpha and gamma crystal forms may provide optimal properties for forming cable ties.

The polyamide composition may include less than about 1 wt. % nucleating agent, more particularly, less than about 0.5 wt. % nucleating agent, and even more particularly between about 0.1 wt. % and about 0.3 wt. % nucleating agent. In one embodiment, the nucleating agent comprises, consists or consists essentially of a polyamide material such as polyamide-22, a first alumina silicate material and a second alumina silicate material such as montmorillonite. For example, the nucleating agent may include between about 1 wt. % and about 5 wt. % alumina silicate, between about 15 wt. % and about 30 wt. % polyamide such as PA22 and between about 65 wt. % and about 85 wt. % montmorillonite.

In some embodiments, the nucleating agent may include the organic material, and one of the first or second inorganic materials as a mixture or combination. Particularly suitable combinations of organic and inorganic materials include polyamides having a ratio of carbon atoms to amide groups of less than 5:1 (such as polyamide 2.2) and metal silicates. In one embodiment, the organic component constitutes greater than 50 wt. % of the combination, more particularly, between about 60 wt. % and about 95 wt. %, even more particularly, between about 75 wt. % and 90 wt. %. The first inorganic component constitutes less than 50 wt. % of the combination, more particularly between about 5 wt. % and about 40 wt. %, even more particularly, between about 5 and about 15 wt. %. An exemplary commercially available combination is BRUGGOLEN P22, a 90 wt. % polyamide-2.2/10 wt. % alumina silicate material manufactured by Brueggemann Chemical.

A variety of amino functional silicone oils may be suitable for use with embodiments of the present invention. In some embodiments, amino functional silicones have good compatibility with nylon as a result of the amine groups in the macromolecular chain. Examples of suitable amino functional silicone oils include those available under the XIAMETER® name, including XIAMETER® OFX-8417, XIAMETER® OFX-8822 and XIAMETER® OFX-8468. Further examples of suitable amino functional silicone oils include BD-1007.

A variety of lubricating agents may be suitable for use with embodiments of the present invention. Examples of suitable lubricating agents include stearamides such as ethylene-bis-stearamide, stearates such as zinc stearate, magnesium stearate, calcium stearate, and sodium stearate, glycerol fatty acid esters such as glycerol monostearate, polysiloxanes such as polydimethylsiloxane, polyolefins, and ethylenevinylacetate copolymers. Particularly suitable additives include calcium stearate and/or ethylene-bis-stearamide. The lubricating agent may constitute less than 5 wt. % of the polyamide composition, more particularly, less than 2 wt. % of the polyamide composition.

Table 1 sets forth exemplary embodiments of the nucleated PA6:

TABLE 1

| Component | Embodiment 1 (wt. %) | Embodiment 2 (wt. %) | Embodiment 3 (wt. %) |
|---|---|---|---|
| PA6 | 90.0-99.5 | 97.0-99.5 | 97.0-99.0 |
| Nucleating Agent | 0.05-1.50 | 0.1-0.5 | 0.1-0.3 |
| Silicone Oil | 0.2-5 | 0.5-2 | 0.5-1.5 |
| Lubricating Agent | 0.05-2 | 0.1-1.5 | 0.1-1.0 |

Tables 2 and 3 set forth additional exemplary embodiments of the nucleated PA6:

TABLE 2

| | Material | Content(wt. %) |
|---|---|---|
| PA6 | H35ZI | 97.4 |
| Nucleating agent | Nano clay (organic modified montmorillonoid) | 0.15 |
| | BRUGGOLEN ® P22 | 0.05 |
| Amino silicon oil | ASO | 1 |
| Lubricants | Calcium stearate (CaSt) | 0.5 |
| | Glycerol Monostearate (GMS) | 0.5 |
| | N,N'-ethylene bis-stearamide (EBS) | 0.4 |

TABLE 3

| | Material | Content(wt. %) |
|---|---|---|
| PA6 | H35ZI | 98.9 |
| Nucleating agent | Nano clay (organic modified montmorillonoid) | 0.15 |
| | BRUGGOLEN ® P22 | 0.05 |
| Lubricants | Calcium stearate (CaSt) | 0.5 |
| | N,N'-ethylene bis-stearamide (EBS) | 0.4 |

The nucleated PA6 composition may further include a variety of optional additives. Exemplary additives include, but are not limited to: antioxidants, thermal stabilizers, anti-weathering agents, mold releasing agents, pigments, dyes, plasticizers, antistatic agents, flame retardants, glass fillers, mineral fillers and impact modifiers. The polyamide composition may also include a fibrous or particulate filler, which functions to increase the modulus and stiffness of the composition.

The nucleated PA6 composition may be formed by conventional procedures. In one embodiment, the various raw materials are blended together. Appropriate blending techniques include melt extrusion, batch melting and the like. In one useful procedure, the blending procedure can be carried out at elevated temperatures above the melting point of the polymer and the nucleating agent either preformed, as individual components of the agent separately, or as a combination of the components in a suitable form such as granules, pellets and powders added to the melt with vigorous stirring.

Alternatively, all or a portion of the various components of the nucleating agent can be masterbatched or preblended with the polyamide in the melt, and this premixed or masterbatch may be added to the polyamide in the melt in amounts sufficient to provide the desired amount of nucleating agent in the polyamide product. Stirring is continued until a homogeneous composition is formed. Blending temperatures and blending pressures, and the order of addition of the various components may be varied as desired provided that a substantially homogeneous composition results. The blending procedure can be carried out at elevated temperatures, in which case the polymer component is melted and the solid nucleating agents are admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

Figure 2:
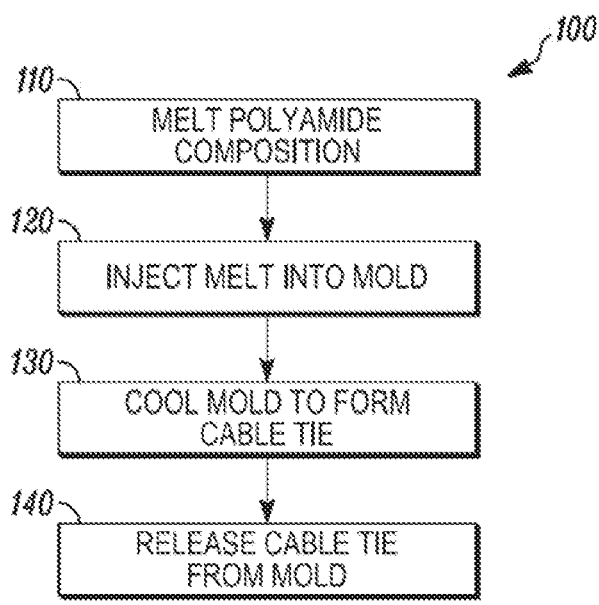
FIG. 2 is a flowchart illustrating a method of forming a cable tie according to embodiments of the present invention.

FIG. 2 illustrates a method 10 of forming a nucleated PA6 composition according to embodiments of the present invention. A polyamide mixture is formed by blending the polyamide material, the nucleating agent, the amino functional silicone oil and the lubricating agent (block 20). The mixture is then compounded (block 30) and pelletized (block 40). The pellets are then batch mixed (block 50) and packaged (block 60) in a desired form for future use.

The resulting polyamide composition may be utilized to manufacture a variety of molded articles, fibers and films. Suitable molding techniques include injection molding, melt spinning, casting and extruding. In a particular embodiment, the polyamide composition may be used to manufacture electronic cable ties by injection molding techniques.

II. BLENDS OF NUCLEATED PA6 AND PA 66

In some embodiments, the nucleated PA6 composition is then blended with at least one additional polyamide material such as a PA66 material. The resulting polyamide blend may include as little as 1 wt. %, 5 wt. %, 10 wt. %, 35 wt. % or 50 wt. % or as much as 65 wt. %, 90 wt. %, 95 wt. % or 99 wt. % of the PA66, and may include as little as 1 wt. %, 5 wt. %, 10 wt. %, 35 wt. % or 50 wt. % or as much as 65 wt. %, 90 wt. %, 95 wt. % or 99 wt. % of the nucleated PA6 composition, or any ranges of each of the foregoing components delimited by any pair of values in the foregoing respective ranges. In one embodiment, the resulting polyamide blend may include from about 5 wt. % to about 95 wt. % of the polyamide-66 composition, more particularly, from about 10 wt. % to about 50 wt. % or more of the polyamide-66 composition. In some embodiments, the polyamide composition may also include carbon black.

In some embodiments, carbon black is used as a UV light stabilizer, particularly in outdoor applications, as well as to provide color to the resultant products. In many cases, carbon black is available as a polyolefin-based masterbatch or a polyamide-based masterbatch. In some embodiments, a polyolefin-based masterbatch is used because it is less expensive than polyamide-based masterbatch. A carbon black masterbatch may contain up to about 50 weight percent of carbon black. The masterbatch may also include dispersing additives such as natural waxes, synthetic waxes, polyolefin waxes, fatty acids, stearic acid, fatty acid esters or amides, EBS, saponified fatty acids, stearates, sorbitanic acid ester, glycerol ester, oligomeric polyacrylates, oligomeric polyethers, oligomeric polyesters and combinations thereof.

In some cases, even very low concentrations of carbon black may make PA66 brittle. Without wishing to be bound by theory, it is believed that carbon black may contribute to a heterogeneous nucleating effect during PA66 crystallization. Poor particle dispersion of the carbon black may also play a role. PA6 is widely used by cable tie manufacturers to improve toughness. PA6 and PA66 are partially miscible polymers and will influence each other's crystallization during cooling from the melt. After adding PA6 in PA66, the toughness of the PA66 can be improved and the strength will decrease. However generic PA6 resin can't be added in PA66 more than 01 wt %, since PA6 will decrease the crystallinity degree and make the de-molding difficulty.

It has been determined that useful polyamide blends that include PA66, carbon black and significant amounts of PA6 are successfully formed using a nucleated PA6 as discussed above. Table 4 below provides exemplary polyamide blends.

TABLE 4

| Component | Embodiment 1 (wt. %) | Embodiment 2 (wt. %) | Embodiment 3 (wt. %) |
|---|---|---|---|
| PA66 | 1-99 | 10-90 | 50-90 |
| Nucleated PA6 | 1-99 | 10-90 | 10-50 |
| Carbon Black | 0.001-20 | 0.01-5 | 0.1-1 |

Figure 3:
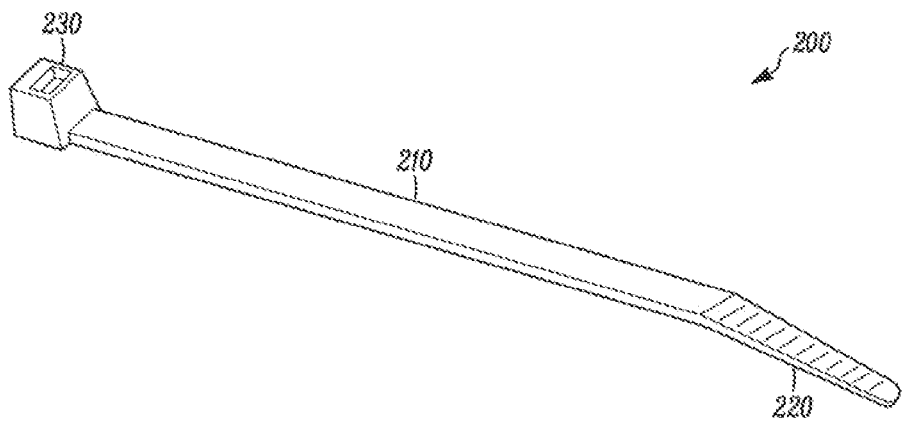
FIG. 3 shows a cable tie manufactured according to embodiments of the present invention.

FIG. 3 illustrates a method 100 of forming cable ties according to embodiments of the present invention. A polyamide composition as described above is melted at a suitable temperature, for example between about 250° C. and 300° C. (block 110). The composition is then injected into a suitable mold at an injection pressure that is preferably below about 1000 kgf/cm$^2$ (block 120). The mold is cooled to solidify the polyamide composition in the form of a cable tie (block 130). The cable tie is then released from the mold (block 140).

Figure 4:
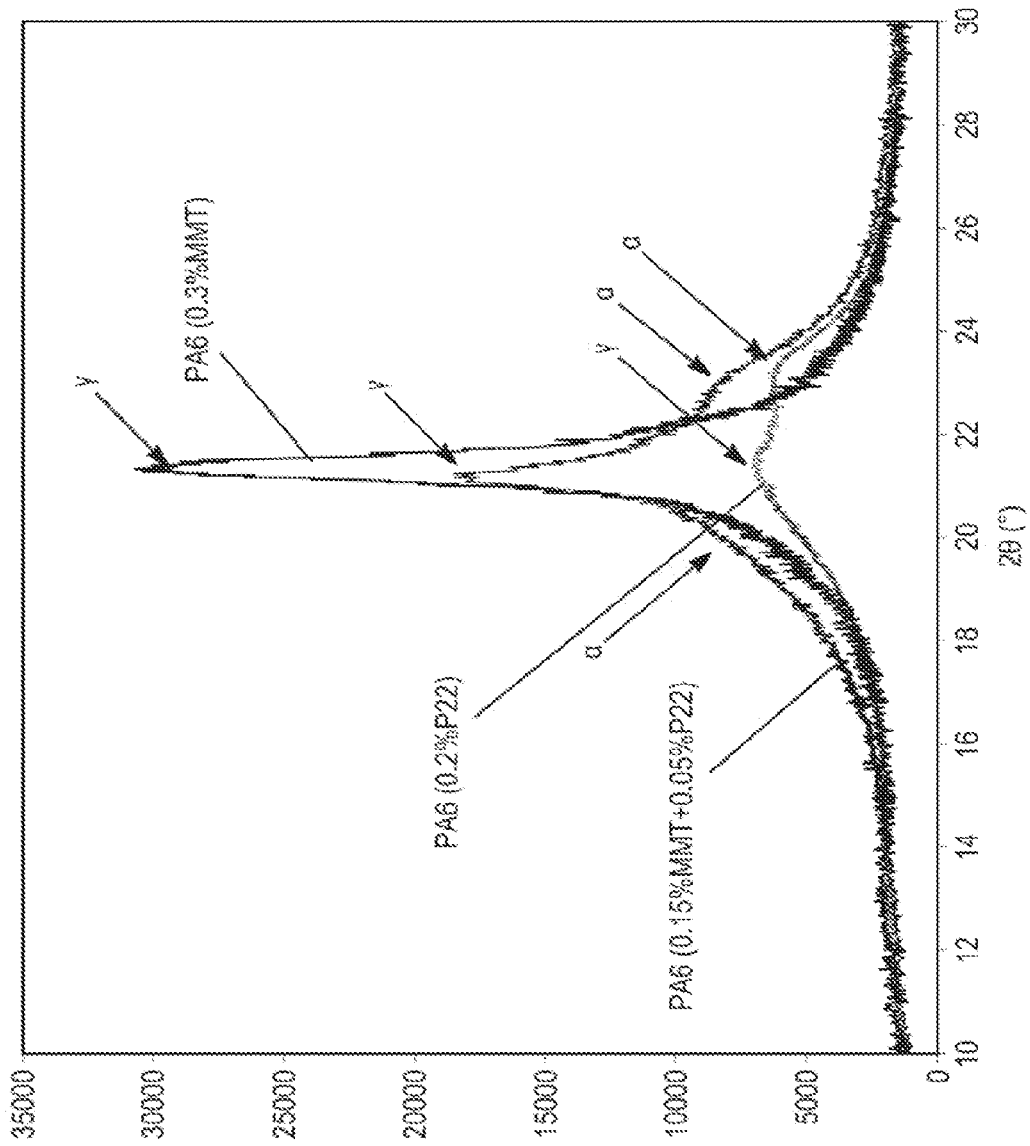
FIG. 4 is a graphical representation of crystalline structures of the polyamide compositions described in Example 8.

FIG. 4 shows an exemplary cable tie 200 according to one embodiment of the present invention. The cable tie 200 includes an elongate body 210, gear teeth 220 and a ratchet 230. In use, the cable tie 200 is wrapped around an object or objects, and the teeth 220 are inserted into the ratchet 230. The ratchet 230 includes a locking mechanism that interfaces with individual gear teeth. Of course, a variety of different cable tie configurations can be manufactured using the polyamide compositions of the present invention.

As set forth in the examples below, cable ties formed from the polyamide compositions of the present invention exhibit improved crystallinity, lower injection pressure, reduced mold sticking and sprue breakage and/or lower brittleness compared to both conventional PA6 and PA66 compositions. As such the polyamide compositions of the present invention are a viable substitute for PA66 for a variety of applications including for forming cable ties.

III. EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A. Examples 1-4 and Comparative Examples A-E

The compositions of Examples 1-4 and Comparative Examples A-E set forth in Table 5 below are expressed in terms of weight percent and were master-batched by tumble blending the ingredients, and feeding the tumbled ingredients into the throat of a twin screw extruder (lab size 30 mm diameters) utilizing standard lab practices. H35ZI is a polyamide-6 composition available from Honeywell International Inc. MMT is an organic modified montmorillonoid clay nucleating agent available from Jiangxi Gukang of Yichun, Jiangxi China as GK-8. P22 is a nucleating agent available from Bruggemann Chemical that constitutes a 90 wt. % polyamide-2.2/10 wt. % alumina silicate mixture. CaV102 is a nucleating agent and stands for Licomont® CaV102, which is a calcium salt of montanic acid, which is a long chain saturated linear carboxylic acid.

ASO BD-1007 is an amino functional silicone. ZnSt is zinc stearate and is an external lubricant. CaSt is calcium stearate and is an external lubricant. GMS is glycerol monostearate and is an internal lubricant. EBS is N/N'-ethylene bis-stearamide, an internal lubricant. PA66 21SPC is a commercial PA66 for cable tie applications.

TABLE 5

| | Component | | | | | | | | | |
|---|---|---|---|---|---|---|---|---|---|---|
| | H35ZI | MMT | P22 | CaV102 | ASO BD-1007 | ZnSt | CaSt | GMS | EBS | PA66 21SPC |
| Example | | | | | | | | | | |
| 1 | 98.3 | 0.15 | 0.05 | | 1 | | | | 0.5 | |
| 2 | 98.3 | 0.1 | 0.1 | | 1 | | | | 0.5 | |
| 3 | 98.3 | 0.05 | 0.15 | | 1 | | | | 0.5 | |
| 4 | 97.4 | 0.15 | 0.05 | | 1 | | 0.5 | 0.5 | 0.4 | |
| Comp Ex. | | | | | | | | | | |
| A | 98.3 | 0.2 | | | 1 | | | | 0.5 | |
| B | 97.73 | | 0.2 | | 1 | 0.97 | | | 0.1 | |
| C | 98.3 | 0.15 | | 0.05 | 1 | | | | 0.5 | |
| D | 98.3 | 0.05 | | 0.15 | 1 | | | | 0.5 | |
| E | | | | | | | | | | 100 |

Compositions 1-4 and Comparative Examples A-E were injection-molded to form cable ties for testing purposes. As shown below in Table 6, the table ties were subjected to a bend test under several different conditions as well as a fall hammer impact test. In the bend test (dry molded), a cable tie is bent 180 degrees and the fracture number is recorded. In the bend test (cold conditioned), the cable tie is subjected to a temperature of −40° C. for 2 hours before being bent 180 degrees as before. In the bend test (warm aged), the cable tie is dried at 80° C. for 24 hours as before. After being at room temperature for 20 minutes, the cable tie is bent 180 degrees as before. In the fall hammer impact test, the cable tie is installed on a steel mandrel and is placed at −40° C. for 2 hours. The sample is then placed on a V block and a free fall hammer impacts the strap ten seconds after removal of the test assembly from the freezer.

TABLE 6

| | | | | | Example | | | | |
|---|---|---|---|---|---|---|---|---|---|
| | | 1 | 2 | 3 | 4 | A | B | C | D | E |
| Injection molding temperature | | | | | 285° C. | | | | | 295° C. |
| Injection Pressure (kgf/cm$^2$) | | 1075 | 1050 | 1050 | 950 | 1050 | 1100 | 1075 | 1075 | 1400 |
| Bend Test (# in 10) | dry molded | 0 | 0 | 0 | 0 | 0 | 0 | 0 | 0 | 0 |
| | cold conditioned | 2 | 2 | 4 | 2 | 10 | 0 | 10 | 10 | 1 |
| | warm aged | 0 | 0 | 0 | 0 | 0 | 10 | 2 | 2 | 0 |
| Fall hammer test | | 2 | 0 | 1 | 0 | 0 | 0 | 1 | 3 | 1 |

As can be seen, Comparative Example A (MMT only) performed poorly at cold temperatures, with all ten samples breaking. Comparative Example B (P22 only) performed poorly in the warm aging test, with all ten samples breaking. In Comparative Examples C and D, MMT was paired with CaV102, which performed poorly at cold temperatures, with all ten samples of each breaking. Note that the commercial PA66 material required a higher melt temperature and injection pressure for processing.

With respect to Examples 1-4, it can be seen that Examples 2 and 4 performed better than Examples 1 and 3. In Example 2, the relative amounts of MMT and P22 were equal. In Example 4, there was a 3 to 1 ratio of MMT to P22. Example 1 also had a 3 to 1 ratio of MMT to P22, but lacked the calcium stearate and glyceryl monostearate included in Example 4. Example 3 had a 1 to 3 ratio of MMT to P22.

The compositions of Examples 1 and 5-7 and Comparative Examples F-I are set forth in Table 7 below. Examples 1 and 5-7 have the same MMT to P22 ratio, but include differing amino silicone oils. ASO OFX-8417 is XIAMETER® OFX-8417, an amino functional silicone. ASO OFX-8822 is XIAMETER® OFX-8822, an amino functional silicone. ASO OFX-8468 is XIAMETER® OFX-8468, an amino functional silicone. ESO BD-1208 is an epoxy functional silicone. N-BBSA is n-butyl benzene sulfonamide.

TABLE 7

| | H35ZI | MMT | P22 | ASO BD-1007 | ASO OFX-8417 | ASO OFX-8822 | ASO OFX-8468 | ESO BD-1208 | N-BBSA | ZnSt | EBS |
|---|---|---|---|---|---|---|---|---|---|---|---|
| Example | | | | | | | | | | | |
| 1 | 98.3 | 0.15 | 0.05 | 1 | | | | | | | 0.5 |
| 5 | 98.3 | 0.15 | 0.05 | | 1 | | | | | | 0.5 |
| 6 | 98.3 | 0.15 | 0.05 | | | 1 | | | | | 0.5 |
| 7 | 98.3 | 0.15 | 0.05 | | | | 1 | | | | 0.5 |
| Comp Ex | | | | | | | | | | | |
| F | 98.73 | | 0.2 | | | | | | | 0.97 | 0.1 |
| G | 98.63 | 0.3 | | | | | | | | 0.97 | 0.1 |
| H | 97.73 | | 0.2 | | | | | 1 | | 0.97 | 0.1 |
| I | 98.3 | 0.2 | | | | | | 1 | 0.5 | | |

These compositions were tested as before. The test results are summarized below in Table 8.

TABLE 8

| | | | | Example | | | | |
|---|---|---|---|---|---|---|---|---|
| | | 1 | 5 | 6 | 7 | F | G | H | I |
| Injection molding temperature | | | | | 285° C. | | | | |
| Injection Pressure (kgf/cm$^2$) | | 1075 | 1150 | 1150 | 1150 | 1100 | 950 | 950 | 1075 |
| Bend Test (# in 10) | dry molded | 0 | 0 | 0 | 2 | 0 | 10 | 5 | 5 |
| | cold conditioned | 2 | 2 | 5 | 4 | 8 | 10 | 9 | 10 |
| | warm aged | 0 | 1 | 0 | 0 | 6 | 10 | 7 | 10 |
| Fall hammer test | | 2 | 0 | 1 | 1 | 0 | 10 | 6 | 3 |

Examples 1 and 5-7 illustrate the use of different grades of amino functional silicone. Examples 1 and 5 outperformed Examples 6 and 7. Comparative Examples F and G lacked an amino functional silicone and performed poorly. Comparative Example H illustrated that an epoxy functional silicone does not work. Comparative Example I illustrated that a plasticizer for polyamide does not work.

B. Example 8

Non-isothermal analyses were carried out using a differential scanning calorimeter thermal analyzer (DSC). Each sample was heated from 25° C. to 280° C. at a rate of 50 Kelvin (K) per minute (K/min). The 280° C. temperature was maintained for two minutes and the samples were then cooled back to 25° C. at varying rate of 2.5 K/min, 5 K/min, 10 K/min, 20 K/min and 40 K/min. The test data was analyzed using Mo Zhishen's method (see Qiao X Y, Wang X H, Zhao X J, Mo Z S, Zhang H F (2000) *Synthetic Met* 113.1).

The Crystallization data is summarized below in Table 9. The PA6 containing MMT has a lower necessary cooling rate "F(t)" to achieve a defined degree of crystallinity at a particular unit time "X(t)" than the PA6 containing P22. The lower F(t) value indicates a faster crystallization rate. The alpha value in Table 6 is a ratio of an Avrami index (used in isothermal crystallization kinetic studies) and an Ozawa index (used in non-isothermal crystallization kinetic studies). As can be seen, the PA6, the PA6 (MMT) and PA6 (P22) have a relatively constant alpha value. In contrast, the PA6 (MMT and P22) has a variable alpha value, indicating that the crystallization mechanism is complex.

TABLE 9

| X()t), % | PA6 F(T) | PA6 alpha | PA6 (0.3% MMT) F(T) | PA6 (0.3% MMT) alpha | PA6 (0.2% P22) F(T) | PA6 (0.2% P22) alpha | PA6 (0.15% MMT + 0.05% P22) F(T) | PA6 (0.15% MMT + 0.05% P22) alpha |
|---|---|---|---|---|---|---|---|---|
| 20 | 6.92 | 1.85 | 3.1 | 1.35 | 3.14 | 1.4 | 5.95 | 0.87 |
| 40 | 10.23 | 1.76 | 4.21 | 1.37 | 4.59 | 1.41 | 6.91 | 0.92 |
| 60 | 13.35 | 1.72 | 5.66 | 1.44 | 6.65 | 1.45 | 8.29 | 0.99 |
| 80 | 18.12 | 1.71 | 9.95 | 1.51 | 12.24 | 1.42 | 11.57 | 1.12 |
| 90 | 24.62 | 1.74 | 19.56 | 1.46 | 22.14 | 1.32 | 18.68 | 1.27 |

Differences in crystal form using a combination of MMT and P22 as a nucleating agent was also observed using wide angle X ray diffraction. FIG. 4 is a graphical representation of intensity, in which the relative intensity (height) is an indication of the relative amounts of the alpha and gamma crystal forms present in two PA6 compositions. Notably, PA6 containing MMT includes only the gamma crystal form. PA6 containing P22 includes both alpha and gamma forms, but the alpha form is predominant. The alpha and gamma forms also coexist in the PA6 having both P22 and MMT nucleating agents, but FIG. 4 indicates that the gamma form is predominant.

The examples indicate that PA6 with MMT is more brittle than PA6 with P22, but has a higher crystallization rate. By combining MMT and P22 as a nucleating agent, a balanced crystallization rate and toughness can be obtained. This balance may be attributable to the more complex crystal formed by combining the nucleating agents.

C. Examples 9-11 and Comparative Examples J-Q

The compositions of Examples 9-11 and Comparative Examples J-Q are set forth in Table 10 below and are given in terms of weight percent. Vydyne® 21SPC is a widely used PA66 material produced by Solutia. Zytel® ST801 is an impact modified PA66 material produced by DuPont. Nucleated PA6 is a nucleated PA6 with the formulation shown above in TABLE 1. H35ZI is a PA6 base resin without additives. Carbon black masterbatch contains 50 wt % carbon black particles and 50 wt % polyolefin base resin.

A Leistritz twin screw extruder (D=27 mm, L/D=36) was used for preparation of HON PA6. Prior to blending with other additives, PA6 chips were dried in a dehumidified oven at 75° C. for 12 hours. Other additives were used as received. The temperature of the extruder was maintained at 230° C. and the screw speed was maintained at 500 rpm. The amino silicone oil was added through the liquid feed port. CaSt and EBS were added through the weight loss side feeder. Other additives were pre-mixed with the PA6 chips in a high speed mixer, and added into the extruder through main feeder. A Sumitomo SE100DU injection molding machine was used to prepare the cable tie samples and ASTM tensile test bars. PA66 and/or PA6 pellets were pre-mixed with carbon black masterbatch and then added into the hopper of the injection molding machine.

TABLE 10

| Component | PA66 Vydyne® 21SPC | PA66 Zytel® ST801 | Nucleated PA6 | PA6 H35ZI | Carbon black masterbatch |
|---|---|---|---|---|---|
| Example | | | | | |
| 9 | 66.7 | | 32.9 | | 0.4 |
| 10 | 50 | | 49.6 | | 0.4 |
| 11 | 33.3 | | 66.3 | | 0.4 |
| Comp Ex. | | | | | |
| J | 100 | | | | |
| K | 99.6 | | | | 0.4 |
| L | | | 100 | | |
| M | | | 99.6 | | 0.4 |
| N | 90 | | | 9.6 | 0.4 |
| O | 66.7 | | | 32.6 | 0.4 |
| P | 50 | | | 49.6 | 0.4 |
| Q | 90 | 9.6 | | | 0.4 |

As seen in Table 10, Examples 9-11 are PA66/nucleated PA6 blends including 33 to 66 wt. % nucleated PA6. Pellets of PA66 and nucleated PA6 were blended and injection molded into cable ties and ASTM test bars. Carbon black masterbatch was added at a concentration of 0.4 wt. %.

Comparative Example J is 100 wt. % PA66 21SPC without carbon black. Comparative Example K is 99.6 wt. % PA66 21SPC and 0.4 wt. % carbon black masterbatch. Comparative Example L is 100 wt. % nucleated PA6 without carbon black. Comparative Example M is 99.6 wt. % nucleated PA6 with 0.4 wt. % carbon black masterbatch. Comparative Examples N, O and P are PA66/PA6 blends with various content of neat PA6 (H35ZI) from 10 wt. % to 50 wt. % and 0.4 wt. % of carbon black masterbatch. Comparative Example Q is a PA66 formulation containing 10 wt. % impact modified PA66 ST801.

Figure 6:
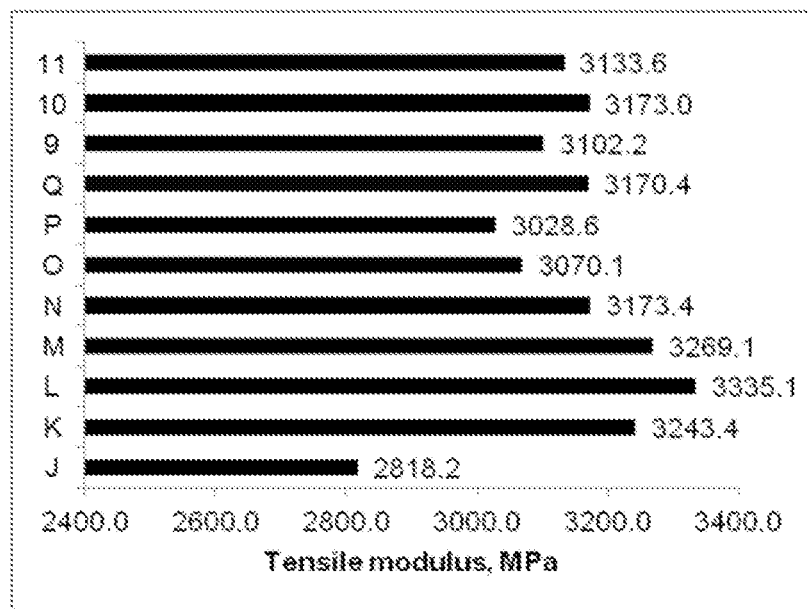
FIG. 6 is a graphical representation of tensile modulus data for the compositions recited in Table 10 in accordance with Examples 9-11 and Comparative Examples J-Q.
Figure 7:
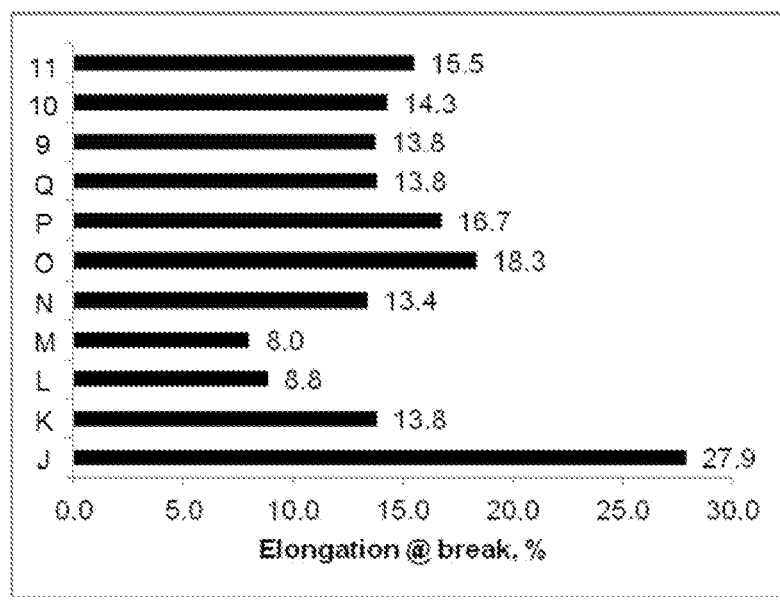
FIG. 7 is a graphical representation of elongation at break data for the compositions recited in Table 10 in accordance with Examples 9-11 and Comparative Examples J-Q.
Figure 8:
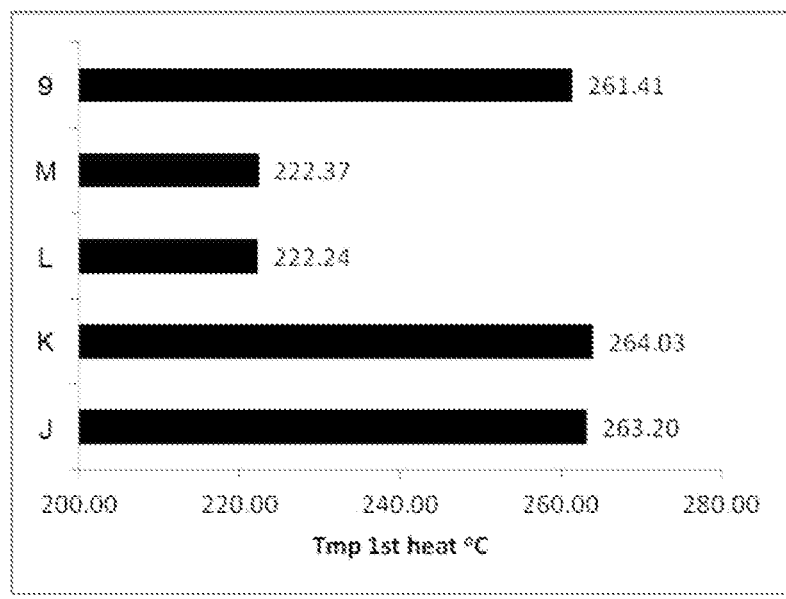
FIG. 8 is a graphical representation of peak melting temperature data for the compositions recited in Table 10 in accordance with Example 9 and Comparative Examples J-M.
Figure 9:
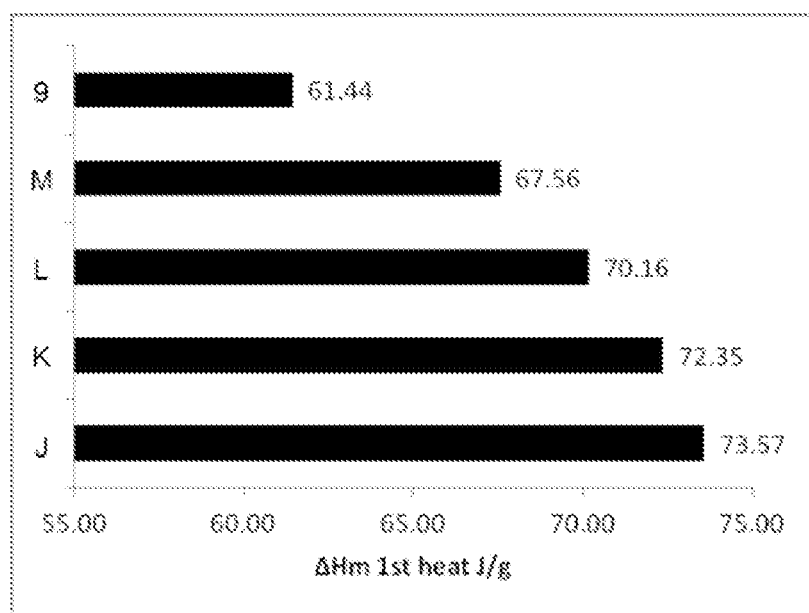
FIG. 9 is a graphical representation of melting enthalpy data for the compositions recited in Table 10 in accordance with Example 9 and Comparative Examples J-M.

In Comparative Example J and L without carbon black, both PA66 21SPC and nucleated PA6 present good toughness (low break % at dry and low temperature state). Since nucleated PA6 is a nucleated PA, it is slightly more brittle than PA66 21SPC (55% break compared to 35% break at −20° C.

dry, 20% break compared to 10% break at −40° C. conditioned state). Its strength and modulus are also higher than PA66 21SPC at dry state (as see in FIGS. 5 and 6). After adding carbon black both materials become very brittle (both totally break at −20° C. dry state, also increased break % at −40° C. conditioned state). The elongation at break also decreased upon adding carbon black, as seen in FIG. 7.

Figure 5:
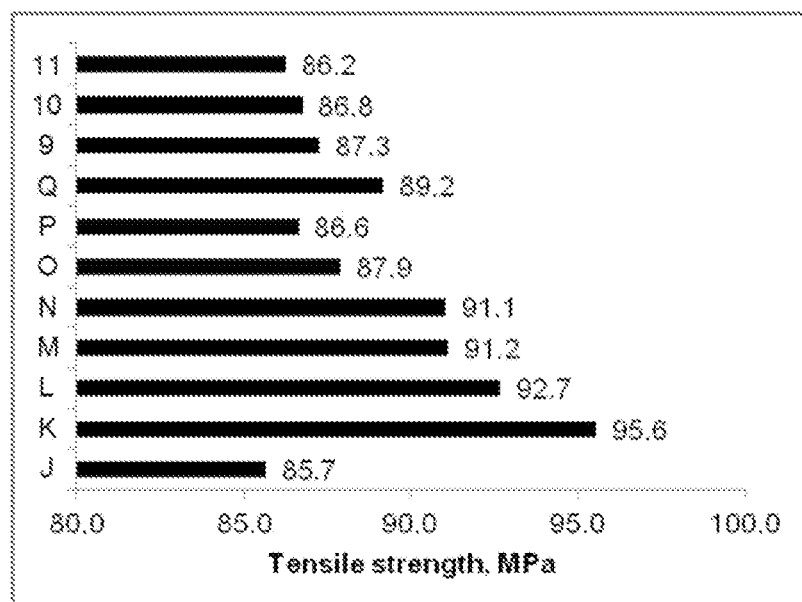
FIG. 5 is a graphical representation of tensile strength data for the compositions recited in Table 10 in accordance with Examples 9-11 and Comparative Examples J-Q.

The tensile strength of PA66 21SPC increases from 85 MPa to 95 MPa after adding carbon black, indicating that the carbon black acts as a nucleating agent in PA66 (FIG. 5). For nucleated PA6, the tensile strength remains at around 91 MPa after adding carbon black since nucleated PA6 already contains nucleating agents (FIG. 5). Blending nucleated PA6 with PA66 21SPC can significantly improve the toughness of cable tie at dry state and low temperature (Table 11 bend test, reduced break % at dry and low temperature).

Examples 9, 10 and 11 also show lower strength and modulus and higher elongation at break than the Comparative Example K and M, as well as a decreased processing temperature and injection molding pressure (Table 11 processing data). Adding more nucleated PA6 slightly decreases the strength (FIG. 5). On the other hand, increasing the content of nucleated PA6 over 50 wt % also decreases the toughness since with an increased amount of nucleated PA6, the overall nucleating agent content is also increased.

Adding too much neat PA6 H35ZI in PA66 will induce the de-molding problem owning to the decreasing of the crystallization rates of PA66 and PA6 in the blend. In the presence of carbon black, the de-molding of PA66/PA6 (neat) is better than that without carbon black since cable tie act as nucleating agent here. However the de-molding of PA66/PA6 (neat) is still worse than PA66/HON PA6 (Table 11 comparative examples N, O and P).

Adding impact modifier in PA66 is a usable solution to improve the toughness of PA66 cable tie. However it is noticed that adding elastomer will increase the viscosity of the resin and cause the injection molding to occur at higher temperature and high pressure (Table 11 Comparative Example Q).

The processing and mechanical properties relate to the melting and crystallization during the injection molding of the PA material. Differential scanning calorimeter thermal analyzer (DSC) was used to study the melting and crystallization behaviors of different PA66, PA6 and PA66/PA6 blends. FIGS. 8-11 present the peak melting temperature (Tmp), melting enthalpy (Hm), peak crystallization temperature (Tcp) and crystallization enthalpy (Hc) of Example 9 and Comparative Examples J, K, L and M. The DSC test was performed by heating the 5 mg sample (cutting from the cable tie sample) from 25° C. to 290° C. at a rate of 10° C./min. the 290° C. temperature was maintained for 5 minutes and then the sample was cooled back to 25° C. at the same rate of 10° C./min.

Figure 10:
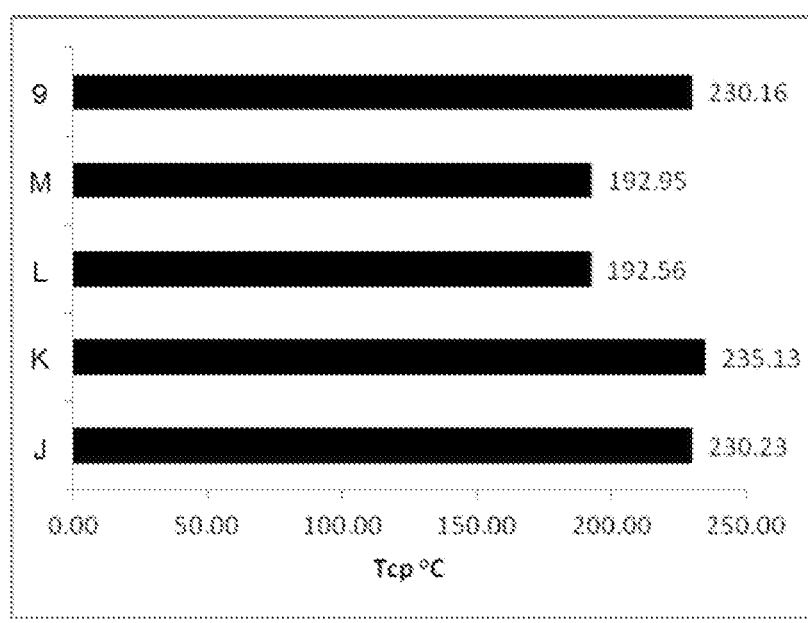
FIG. 10 is a graphical representation of peak crystallization temperature data for the compositions recited in Table 10 in accordance with Example 9 and Comparative Examples J-M.
Figure 11:
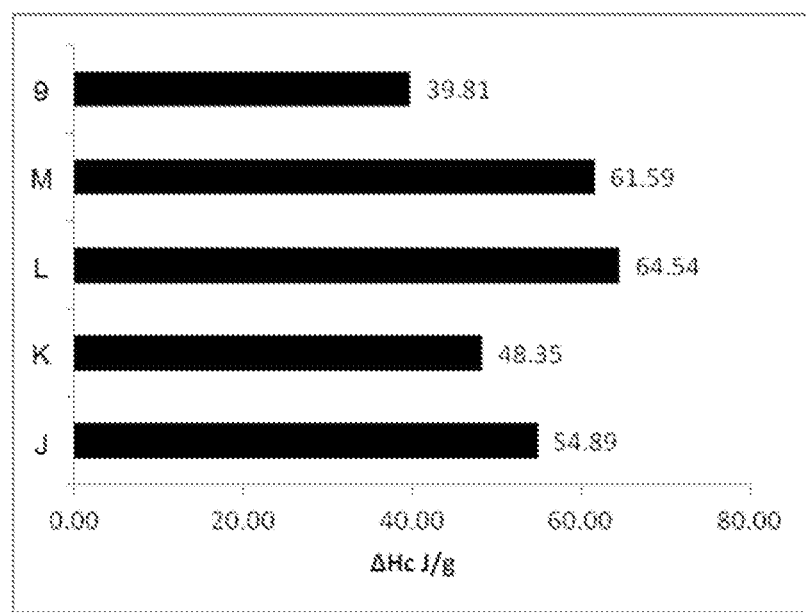
FIG. 11 is a graphical representation of crystallization enthalpy data for the compositions recited in Table 10 in accordance with Example 9 and Comparative Examples J-M.
Figure 12:
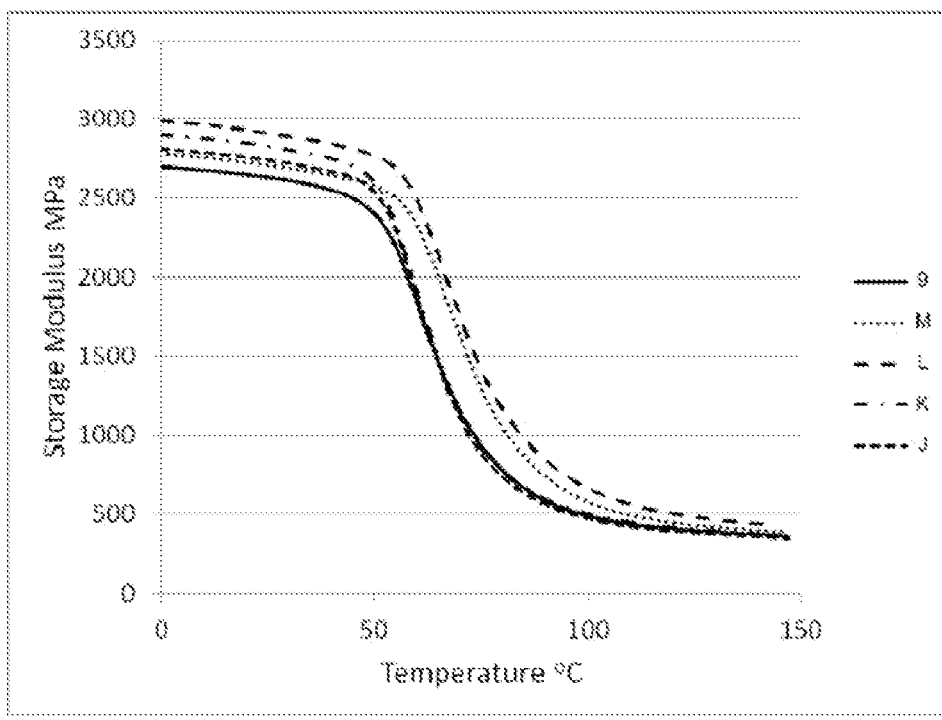
FIG. 12 is a graphical representation of storage modulus data for the compositions recited in Table 10 in accordance with Example 9 and Comparative Examples J-M.

After adding carbon black, the crystallization temperature Tcp of Comparative Example K increased 5° C. compared to Comparative Example J, meaning that carbon black acts as nucleating agent in PA66 (FIG. 10). The melting temperature Tmp also increased from 263.20° C. to 264.03° C. which means higher crystallinity degree and crystal perfection. The Tmp and Tcp of Comparative Examples L and M doesn't show much difference since the nucleated PA6 already contains effective nucleating agents. When the nucleated PA6 is blended into PA66, both the Tcp and Tmp of the PA66 decreased which means the crystallinity degree and crystal perfection were decreased (example 9 in FIGS. 8 and 10), that overcome the brittle issue induced by the addition of carbon black.

Figure 13:
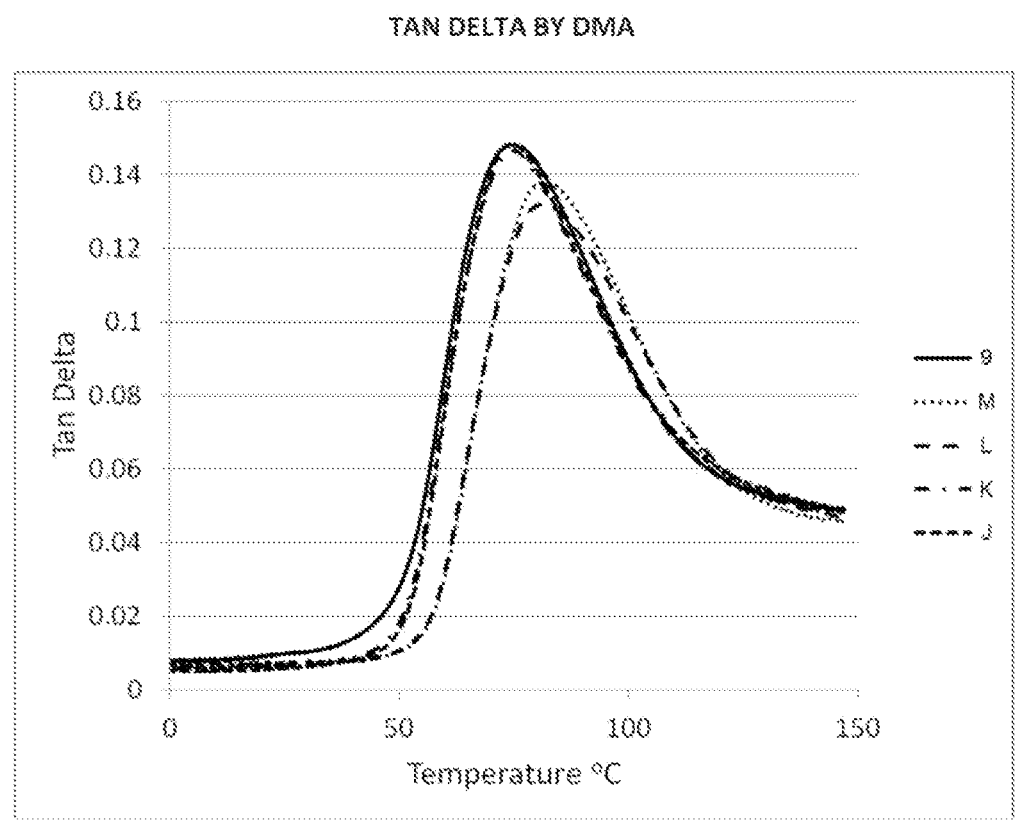
FIG. 13 is a graphical representation of loss factor (tan delta) data for the compositions recited in Table 10 in accordance with Example 9 and Comparative Examples J-M.
Figure 14:
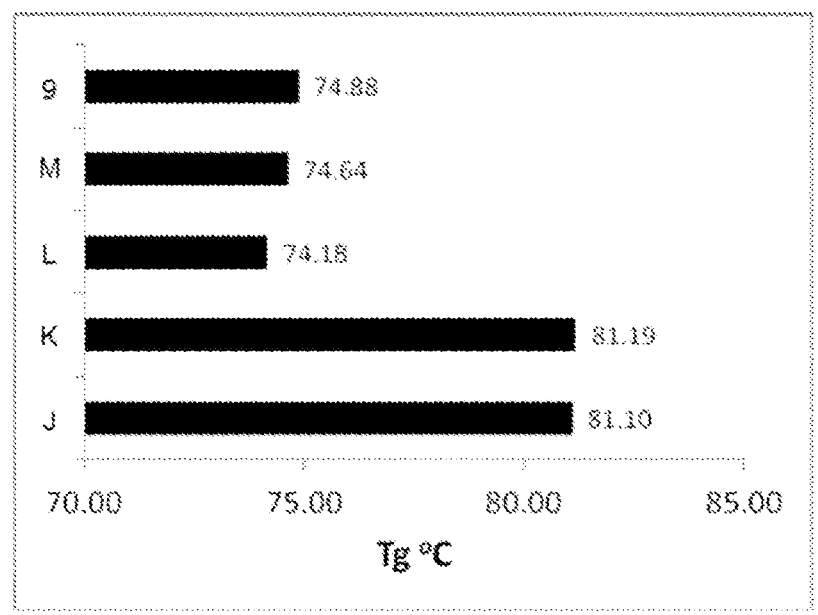
FIG. 14 is a graphical representation of glass transition temperature data for the compositions recited in Table 10 in accordance with Example 9 and Comparative Examples J-M.

Dynamic mechanical analysis (DMA) was used to measure the storage modulus (stiffness) and glass transition (Tg) temperature (peak temperature of the loss factor tan delta) of Example 9 and Comparative Examples J, K, L and M. Example 9 shows the lowest modulus which means the material is more soft and flexible than Comparative Examples J, K, L and M. The glass transition (Tg) temperature was obtained from the peak temperature of FIG. 13 and was plotted in FIG. 14. The addition of PA6 in PA66 (Example 9) has the effect of lowering the glass transition temperature.

TABLE 11

|  |  | Example | | | | | | | | | | |
|---|---|---|---|---|---|---|---|---|---|---|---|---|
|  |  | 1 | 2 | 3 | A | B | C | D | E | F | G | H |
| Inj. Mold. Temp. (° C.) | | 295 | 295 | 295 | 295 | 285 | 285 | 295 | 295 | 295 | 295 | 295 |
| Inj. Press. (kgf/cm$^2$) | | 1050 | 1000 | 950 | 1200 | 1200 | 950 | 1000 | 1150 | 1200 | 1100 | 1350 |
| Demolding | | ok | ok | ok | ok | ok | ok | ok | ok | sticks | sticks | ok |
| Bend Test (break % in 25 ties) | dry as molded, 23° C. | 0 | 0 | 16 | 0 | 20 | 0 | 25 | 0 | 0 | 0 | 0 |
|  | dry as molded, −20° C. | 40 | 35 | 35 | 35 | 100 | 55 | 100 | 75 | 15 | 40 | 35 |
|  | conditioned, −40° C. | 5 | 10 | 20 | 10 | 35 | 20 | 57.5 | 5 | 10 | 20 | 5 |

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A polyamide composition comprising:
   at least 95 wt. % of at least one polyamide-6 material;
   0.045 wt. % to 0.135 wt. % of polyamide-22;
   0.005 wt. % to 0.015 wt. % of alumina silicate;
   0.05 wt. % to 0.15 wt. % of an organic modified montmorillonoid clay; and
   0.5 wt. % to less than 2 wt. % of at least one lubricant.

2. A polyamide blend comprising: the polyamide composition of claim 1 and at least one polyamide-66 material.

3. The polyamide composition of claim 1, wherein the lubricant is selected from the group consisting of ethylene-bis-stearamide, zinc stearate, magnesium stearate, calcium stearate, sodium stearate, glycerol monostearate, polydimethylsiloxane, polyolefin, and ethylenevinylacetate copolymers and combinations thereof.

4. A polyamide composition comprising:
   about 1 to 99 wt. % nucleated polyamide-6 material, the nucleated polyamide-6 material including:

at least 95 wt. % of at least one polyamide-6 material, based on the total weight of the nucleated polyamide-6 material, 0.045 wt. % to 0.135 wt. % polyamide-22 based on the total weight of the nucleated polyamide-6 material;

0.005 wt. % to 0.015 wt. % of alumina silicate;

0.05 wt. % to 0.15 wt. % of an organic modified montmorillonoid clay; and 0.5 wt. % to less than 2 wt. % of at least one lubricant about 99 to 1 wt. % polyamide-66 material; and about 0.001 to about 20 wt. % carbon black.

5. A cable tie produced from the polyamide composition of claim 1.

6. A cable tie produced from the polyamide composition of claim 4.

7. The polyamide composition of claim 1, further comprising an amino functional silicone oil.

8. The polyamide composition of claim 4 comprising about 50 wt. % to about 10 wt. % of the nucleated polyamide-6 material.

9. The polyamide composition of claim 4 comprising about 95 wt. % to about 5 wt. % of the polyamide-66 material.

10. The polyamide composition of claim 1, wherein the at least one lubricant is selected from the group consisting of: ethylene-bis-stearamide, zinc stearate, magnesium stearate, calcium stearate, and sodium stearate.

11. The polyamide composition of claim 10, wherein the at least one lubricant is selected from ethylene-bis-stearamide and calcium stearate.

12. The polyamide composition of claim 11, wherein the at least one lubricant is ethylene-bis-stearamide.

13. A cable tie produced from the polyamide composition of claim 12.

14. The polyamide composition of claim 1, further comprising at least one additive selected from the group consisting of: antioxidants, thermal stabilizers, anti-weathering agents, mold releasing agents, pigments, dyes, plasticizers, antistatic agents, flame retardants, glass fillers, mineral fillers and impact modifiers.

15. The polyamide composition of claim 14, wherein the at least one additive is an antioxidant.

16. A cable tie produced from the polyamide composition of claim 15.

17. The polyamide composition of claim 1, wherein the polyamide-6 material has a viscosity less than about 52 FAV.

18. The polyamide composition of claim 17, wherein the polyamide-6 material has a viscosity between about 25 FAV and about 42 FAV.

19. The polyamide composition of claim 18, wherein the polyamide-6 material has a viscosity between about 30 FAV and about 42 FAV.

20. A cable tie produced from the polyamide composition of claim 19.

* * * * *